(12) United States Patent
Ragan

(10) Patent No.: US 12,122,619 B2
(45) Date of Patent: Oct. 22, 2024

(54) MAGNETIC TRAY ROUTER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 125 days.

(21) Appl. No.: 18/008,865

(22) PCT Filed: Jun. 14, 2021

(86) PCT No.: PCT/US2021/037237
§ 371 (c)(1),
(2) Date: Dec. 7, 2022

(87) PCT Pub. No.: WO2022/015444
PCT Pub. Date: Jan. 20, 2022

(65) Prior Publication Data
US 2023/0219771 A1 Jul. 13, 2023

Related U.S. Application Data

(60) Provisional application No. 63/052,253, filed on Jul. 15, 2020.

(51) Int. Cl.
*B65G 54/02* (2006.01)
*B65G 1/04* (2006.01)
*B65G 47/64* (2006.01)
(52) U.S. Cl.
CPC ........... *B65G 54/02* (2013.01); *B65G 1/0492* (2013.01); *B65G 47/642* (2013.01); *B60L 2200/40* (2013.01)

(58) Field of Classification Search
None
See application file for complete search history.

(56) References Cited

U.S. PATENT DOCUMENTS

| 4,530,637 | A | * | 7/1985 | Mason | B65G 47/912 |
| | | | | | 198/750.12 |
| 9,394,114 | B2 | | 7/2016 | Hanisch et al. | |
| 9,446,902 | B2 | | 9/2016 | Aumann et al. | |
| 9,499,357 | B2 | | 11/2016 | Aumann et al. | |
| 9,997,985 | B2 | | 6/2018 | Prussmeier | |
| 10,308,437 | B2 | | 6/2019 | Clossner et al. | |
| 10,336,559 | B2 | | 7/2019 | Koga et al. | |
| 10,549,954 | B2 | * | 2/2020 | Ginsberg | B66B 5/0031 |
| 10,569,974 | B2 | | 2/2020 | Neubauer | |
| 10,587,212 | B1 | | 3/2020 | Van Dorpe et al. | |
| 10,618,749 | B2 | | 4/2020 | Clossner et al. | |
| 10,734,880 | B2 | | 8/2020 | Urata | |
| 10,759,613 | B2 | | 9/2020 | Neubauer | |

(Continued)

FOREIGN PATENT DOCUMENTS

DE 102018222767 A1 6/2020

*Primary Examiner* — Kavel Singh
(74) *Attorney, Agent, or Firm* — James T. Cronvich

(57) ABSTRACT

A tray shuttle and a tray conveyor using the tray shuttle to route magnetic conveyor trays from one conveyor section to another. The trays and the shuttles are propelled by linear-motor stators that produce electromagnetic flux waves that interact with the magnetic fields of permanent-magnet arrays in movers in each tray. Each shuttle has a main holder mover and one or more other movers connected to a linkage that operates one or more pushers that push trays off a tray holder on the shuttles.

25 Claims, 8 Drawing Sheets

(56) References Cited

U.S. PATENT DOCUMENTS

| | | |
|---|---|---|
| 10,781,854 B2 | 9/2020 | Neufeld et al. |
| 11,393,707 B2 * | 7/2022 | Ahn .................... H02K 49/046 |
| 11,591,167 B2 * | 2/2023 | Jun .................. H01L 21/67766 |
| 11,962,214 B2 * | 4/2024 | Holzleitner .......... H02K 41/031 |
| 2005/0263369 A1 | 12/2005 | Mendenhall |
| 2009/0107806 A1 | 4/2009 | Mendenhall |
| 2020/0030995 A1 | 1/2020 | Lu et al. |
| 2020/0283182 A1 | 9/2020 | Cambedelli |
| 2021/0300693 A1 * | 9/2021 | Lee .................. H01L 21/67742 |

* cited by examiner

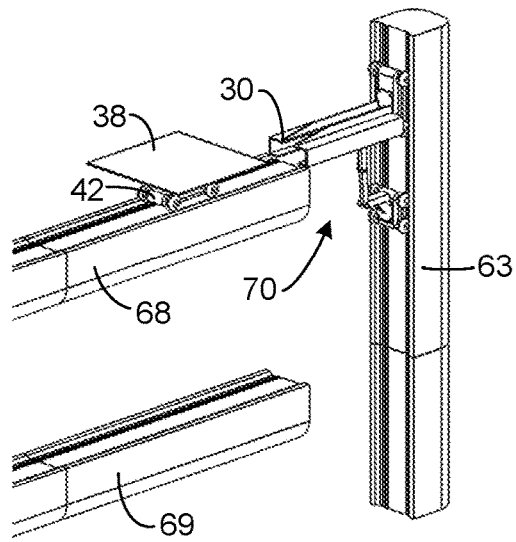
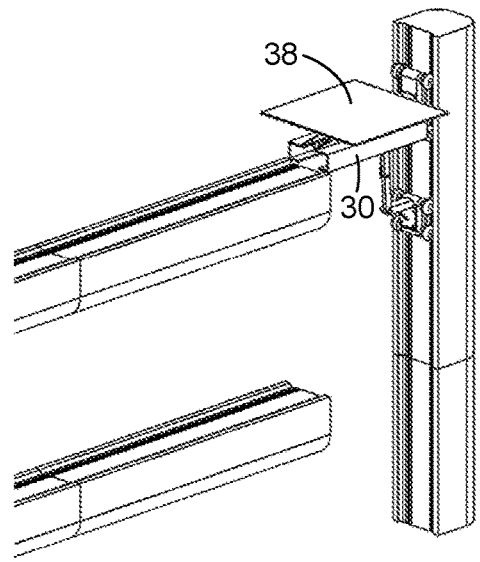
FIG. 3A
FIG. 3B
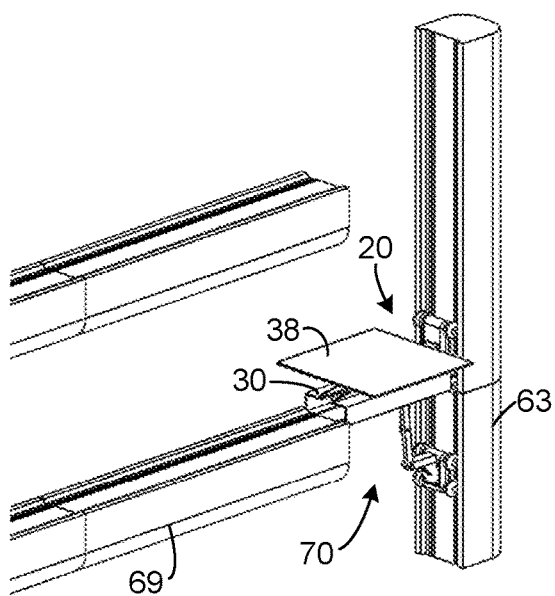
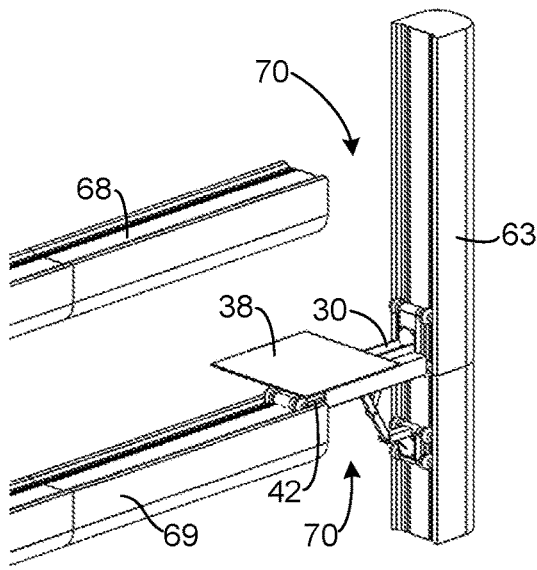
FIG. 3C
FIG. 3D

MAGNETIC TRAY ROUTER

BACKGROUND

The invention relates generally to power-driven conveyors and in particular to routers for magnetic trays.

Tray conveyors are used to transport articles along conveying lines through one or more processing stations on individual trays. The trays are propelled along the conveying line by a chain or by magnetics. Often it is necessary to route a tray from one conveying line to another.

SUMMARY

One version of a tray shuttle comprises first and second movers movable bidirectionally in a travel direction. A tray holder defining a track supported by the first mover extends perpendicular to the travel direction. A pusher is movable along the track. A linkage connecting the pusher to the first and second movers moves the pusher along the track by the movement of the second mover relative to the first mover in the travel direction.

One version of a tray conveyor comprises a conveyor tray and a tray router. The conveyor tray includes a tray mover and a platform supported by the tray mover. The tray router includes a tray shuttle, which includes first and second movers movable bidirectionally in a travel direction. Each mover has a permanent-magnet array. The tray shuttle also includes a tray holder that extends from the first mover to receive the tray mover. A first pusher is movable along the tray holder. A first linkage connecting the first pusher to the first and second movers moves the first pusher to push the conveyor tray along the tray holder by the movement of the second mover relative to the first mover in the travel direction. A transfer linear-motor stator extends along the travel direction and produces an electromagnetic flux wave that interacts with the magnetic field of the permanent-magnet array in the first mover to propel the tray shuttle in the travel direction.

BRIEF DESCRIPTION OF THE DRAWINGS

FIGS. 3A-3D are isometric views illustrating the sequence of lowering a tray on a tray elevator using the tray router of FIG. 2.

DETAILED DESCRIPTION

Figure 1:
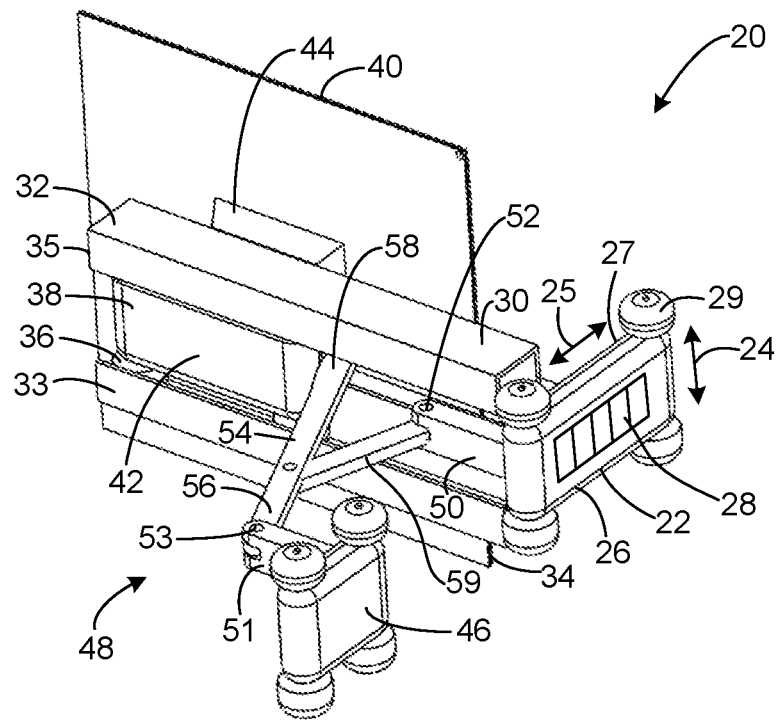
FIG. 1 is an isometric view of one embodiment of an elevating tray shuttle holding a tray.

One illustrative embodiment of a tray shuttle is shown in FIG. 1. The tray shuttle 20 has a first mover 22 that extends in a width direction 24 perpendicular to a bidirectional travel direction 25 from a first side 26 to a laterally opposite second side 27. The first mover 22 includes four wheels 29 and a permanent-magnet array 28, such as a Halbach array, at or near the mover's bottom side. The tray shuttle 20 also includes a tray holder 30 supported by the first mover 22. The tray holder 30 has a pair of parallel rails 32, 33 that define a track that extends from the first mover 22 at a proximal end 34 to a distal end 35. The rails 32, 33 are spaced apart in the width direction 24, and the track is perpendicular to the travel direction 25. The rails 32, 33 are C-shaped to provide channels for wheels 36 of a magnetic conveyor tray 38. The magnetic conveyor tray 38 includes an article-conveying platform 40 connected to a tray mover 42 by a connecting structure 44. The wheels 36 at the four corners of the tray mover 42 are received in the channel formed by the C-shaped rails 32, 33 of the tray holder 30. Like the shuttle's first mover 22, the tray mover 42 includes a permanent-magnet array.

The tray shuttle 20 further includes a second wheeled mover 46 with a permanent-magnet array. Like the first mover 22, the second mover 46 moves in the travel direction 25. A linkage 48, including four linkage bars, or links, connects between the first and second movers 22, 46. First and second static links 50, 51 extend outward of the first and second movers 22, 46 to pivot ends 52, 53. A pusher link 54 is pivotally connected to the first end 53 of the second link 51 at a pivot end 56. The opposite end of the pusher link forms a pusher 58 that is arranged to move along the track between the rails 32, 33 to push the tray mover 42 off the track. A rocker link 59 pivotally connected to the first static link 50 and to the middle of the pusher link 54 forms a Scott-Russell linkage with the other links. The linkage 48 moves the pusher 58 along the track by the movement of the second mover 46 relative to the first mover 22. (The first mover 22 is also referred to as the holder mover, and the second mover 46 is also referred to as the pusher mover.) When the pusher mover 46 is close to the holder mover 22, the pusher 58 is moved to an ejection position at the end of the track opposite the holder mover. When the pusher mover 46 is far from the holder mover 22, the pusher 58 is moved to a retracted position near the holder mover.

Figure 2:
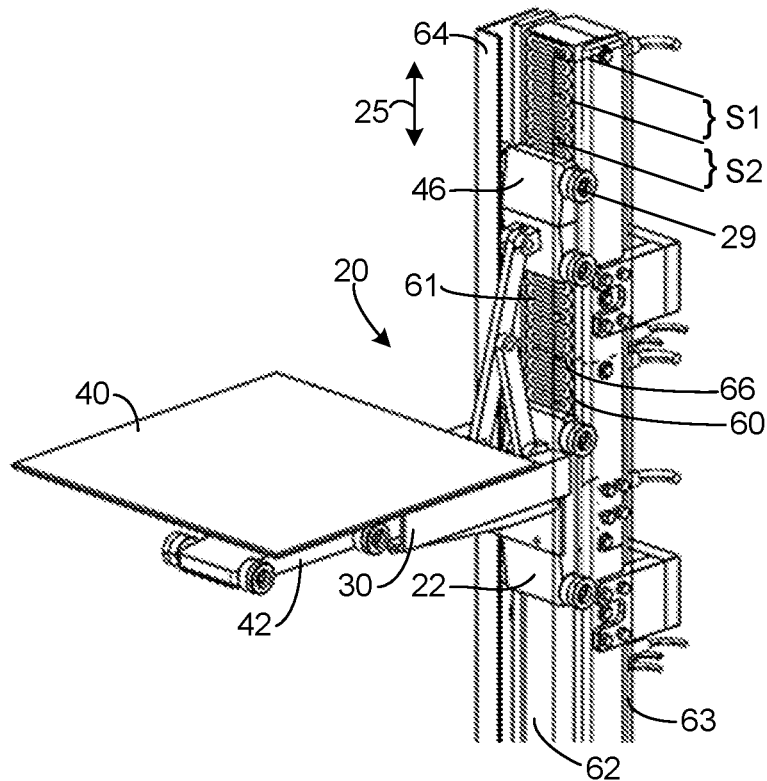
FIG. 2 is an isometric view of an elevating tray router using a tray shuttle as in FIG. 1.

The tray shuttle 20 is shown in an elevator in FIG. 2. The shuttle 20 rides vertically up and down in the bidirectional travel direction 25 along a linear-motor stator 60 housed in a stator enclosure 62. The stator 60 comprises a series of coils 61 grouped in individually energized segments S1, S2, and so on, along its length. The coils produce electromagnetic flux waves that interact with the magnetic fields of the permanent-magnet arrays in the shuttle's movers 22, 46 to propel the shuttle up and down the stator enclosure 62. The stator 60 and the movers 22, 46 form linear synchronous motors. Guide rails 64 (only one shown for simplicity) on each side of the stator 60 confine the wheels 29 of the movers 22, 46 to keep the shuttles 20 on the stator enclosure 62. The stator coils 60, enclosure 62, and guide rails 64 form a stator assembly 63. Together, the tray shuttle 20 and the stator assembly 63 form a tray router.

As shown in FIG. 2, the conveyor tray's mover 42 and its top platform 40 are maintained horizontal by the horizontal orientation of the shuttle's tray holder 30. Position sensors 66 positioned at sensor positions along the length of the stator 60 detect the positions of the shuttle's movers 22, 46.

Figure 4A:
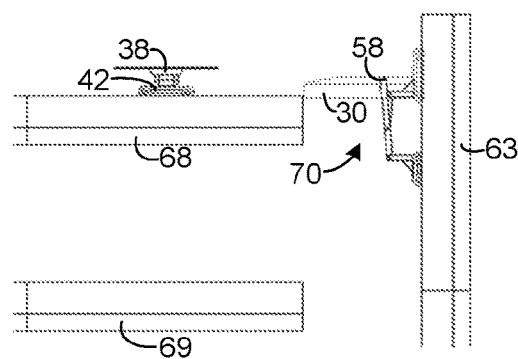
FIGS. 4A-4D are side elevation views of the sequence of FIGS. 3A-3D showing the operation of a tray pusher.

FIGS. 3A-3D and 4A-4D show the operation of the elevator in lowering a conveyor tray 38 from an upper conveyor section 68 to a lower section 69. (In FIG. 2 the pusher mover 46 is shown above the holder mover 22; in FIGS. 3A-4D the pusher mover is shown below the holder mover, which is transparent along with the tray holder 30 in FIGS. 4A-4D to show other features.) Both the upper and lower conveyor sections 68, 69 have linear-motor stators that drive the tray mover 42. FIGS. 3A and 4A depict the conveyor tray 38 before entering the tray holder 30. Propelled by the stator in the upper conveyor section 68, the tray mover 42 rides toward the tray holder 30, which bridges a gap 70 between the upper conveyor section 68 and the elevating tray router's stator assembly 63. The tray holder 30 is stationarily positioned horizontally level with the end of the upper conveyor section 68. As shown in FIG. 4A, the tray pusher 58 is withdrawn in a retracted position to allow the tray 38 to ride onto the tray holder 30.

Figure 4B:
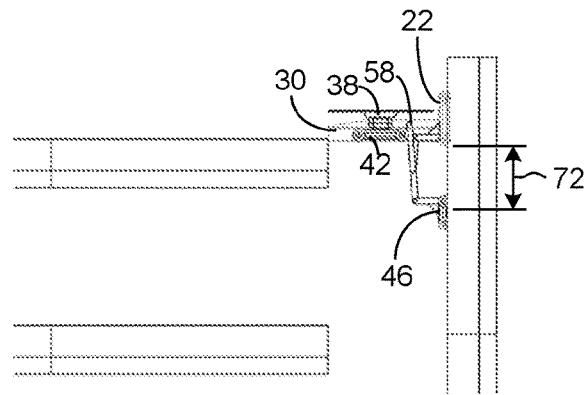
Figure 4C:
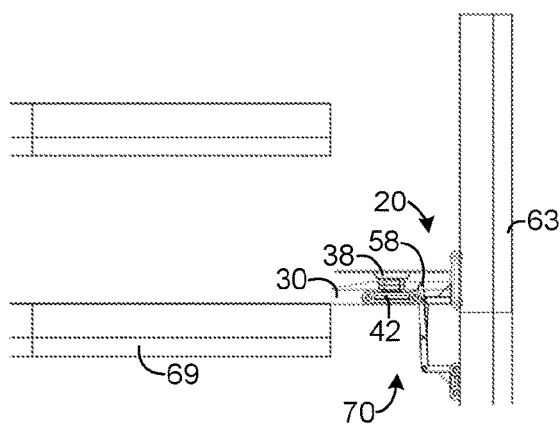

FIGS. 3B and 4B show the tray 38 seated fully on the tray holder 30. In that position the tray's mover 42 is shown in FIG. 4B abutting the retracted tray pusher 58. In the retracted position of the pusher 58, the holder mover 22 and the second mover 46 are spaced apart by a maximum distance 72. FIGS. 3C and 4C show the tray holder 30 positioned to transfer the tray 38 onto the lower conveyor section 69 after the tray shuttle 20 has been moved down the stator assembly 63 from the upper conveyor section 68. In the lower position the tray holder 30 bridges the gap 70 between the end of the lower conveyor section 69 and the stator assembly 63. And the pusher 58 is starting to push the tray's mover 42 off the holder 30.

Figure 4D:
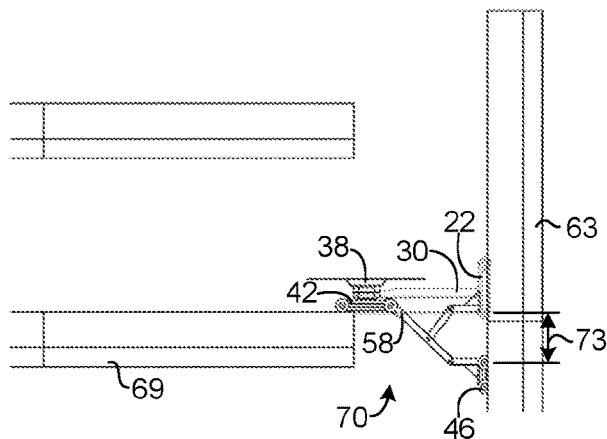

FIGS. 3D and 4D show the tray 38 exiting the tray holder 30 and entering the lower conveyor section 69. With the tray holder 30 bridging the gap 70 between the end of the lower conveyor section 69 and the router's stator assembly, the tray pusher 58 is in an extended ejection position pushing the tray 38 onto the lower conveyor section to be propelled by the lower stator away from the elevator. When the pusher 58 is in the ejection position, the distance between the holder mover 22 and the pusher mover 46 is a minimum distance 73, which is less than the maximum distance 72. Because the stator is divided into individually controlled segments, the pusher mover 46 can be moved relative to the holder mover 22 to change their separation distance and the position of the pusher 58. A tray is similarly transported from the lower conveyor section 69 to the upper section 68 onto which it is ejected from the shuttle.

Figure 5:
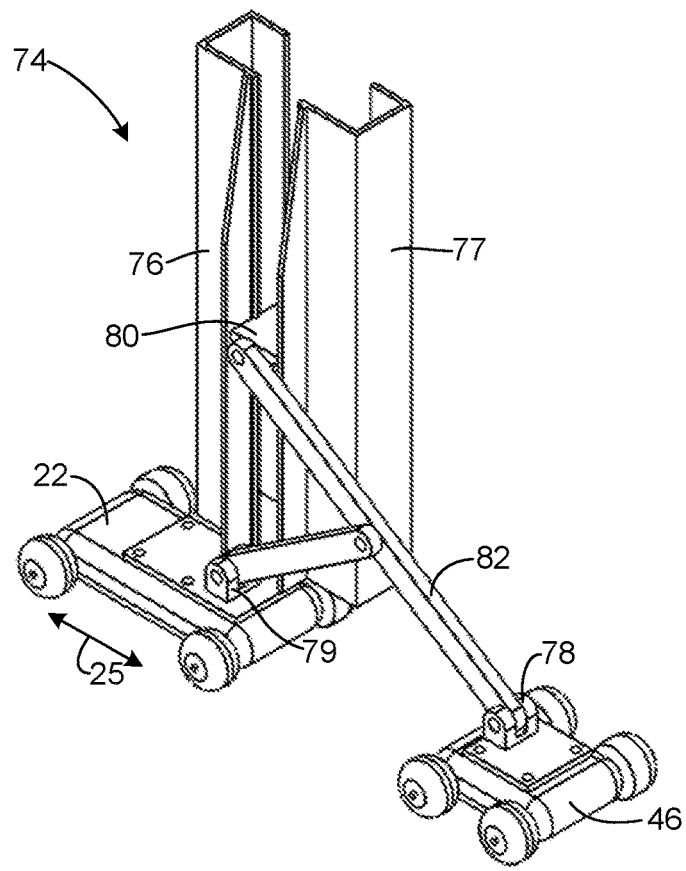
FIG. 5 is an isometric view of another embodiment of a tray shuttle.

Another version of a tray shuttle is shown in FIG. 5. The tray shuttle 74 differs from the tray shuttle 20 of FIG. 1 in that the rails 76, 77 are spaced apart in the travel direction 25 rather than in the width direction. Another difference is that the rails 76, 77 both extend from a lateral side of the first mover 22. And the stationary links 78, 79 are much shorter than the stationary links 50, 51 of FIG. 1. A pusher 80 is pivotally attached to one end of a pusher link 82 that is pivotally attached at its opposite distal end to the stationary link 78. Like the tray shuttle 20 of FIG. 1, the tray shuttle of FIG. 5 moves the pusher 80 between the rails 76, 77 by the movement of the pusher mover 46 relative to the holder mover 22.

Figure 6C:
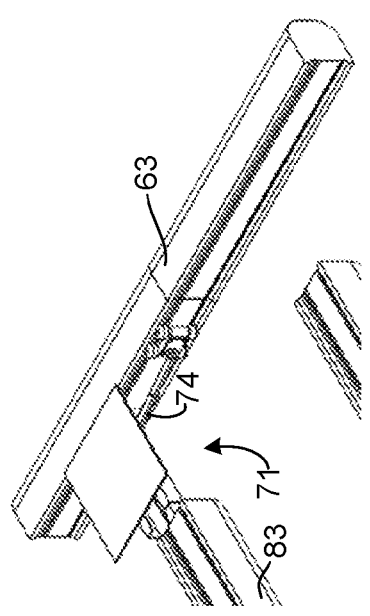
FIGS. 6A-6E are isometric views of an embodiment of a tray conveyor illustrating the sequence of routing a tray to a return.
Figure 6A:
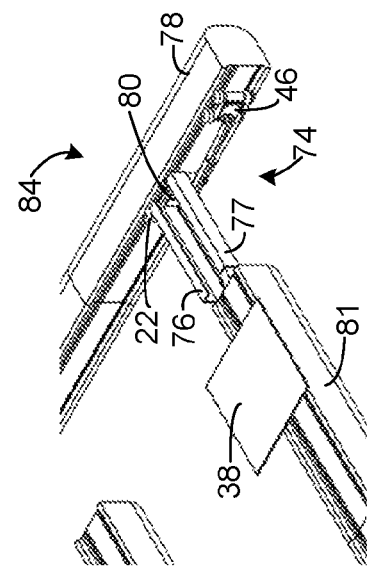
Figure 6B:
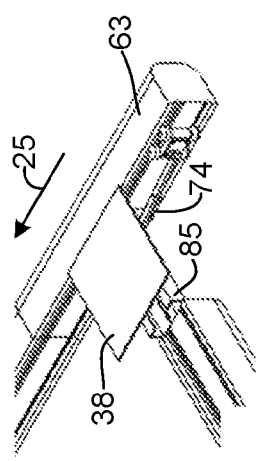
Figure 6E:
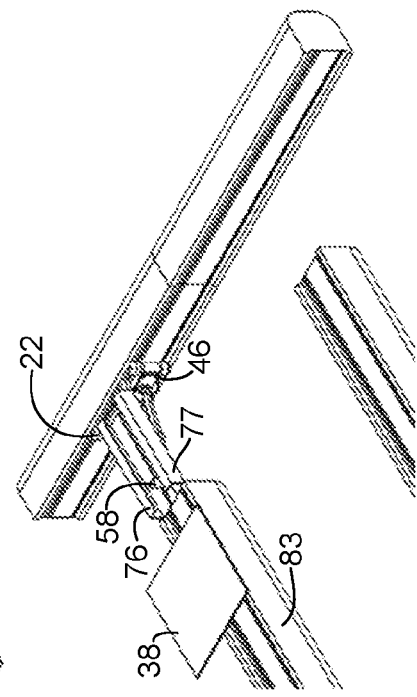
Figure 6D:
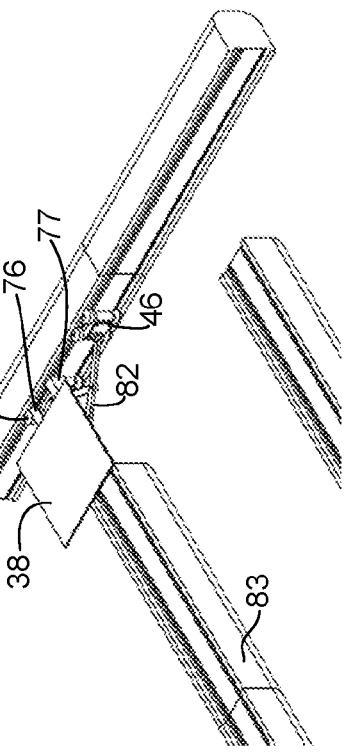

FIGS. 6A-6E show the tray shuttle 74 in a tray router 84 operated as a tray return. The shuttle 74 rides on edge in a horizontal path along a stator assembly 78. The shuttle 74 is retained on the stator assembly by guide rails (not shown) or by the magnetic attraction between ferrous material in the stator assembly 78 and the permanent-magnet array in the holder mover 22 and the second mover 46. In FIG. 6A the pusher 80 is retracted for the rails 76, 77 of the tray holder to receive the tray 38 from a main conveyor section 81. Once the tray 38 is fully on the tray holder 85, as in FIG. 6B, the tray shuttle 74 is propelled in the travel direction 25 by the stator in the horizontally arrayed stator assembly 63. In FIG. 6C the shuttle 74 is shown stopped with the holder 85 bridging the gap 71 between a return conveyor section 83 and the stator assembly 63. In FIGS. 6D and 6E the pusher mover 46 is moved closer to the holder mover by the stator to cause the linkage to move the pusher at the end of the pusher link 82 along the track between the tray holder's rails 76, 77 to eject the tray 38 onto the return conveyor section 83.

Figure 7:
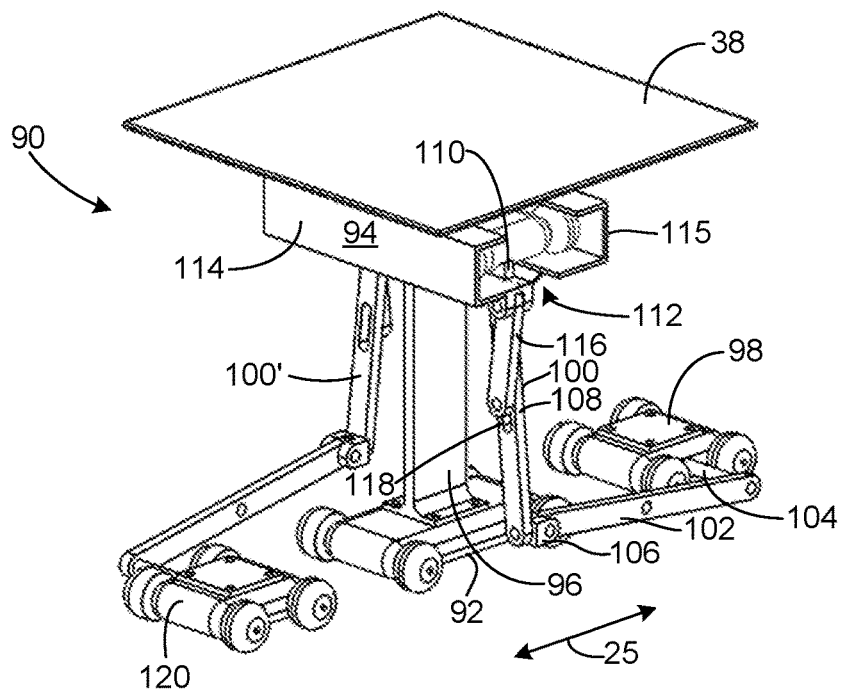
FIG. 7 is an isometric view of a third embodiment of a tray shuttle.

Another embodiment of a tray shuttle is shown in FIG. 7 holding a conveyor tray 38. The tray shuttle 90 has a first mover 92, i.e., a holder mover, supporting a tray holder 94. A spacer, such as web 96, connects the holder 94 to the first mover 92 so that the holder is spaced apart from the first mover. A second mover 98, i.e., a pusher mover, is linked to the holder 94 in the first mover 92 by a first linkage 100. The first linkage 100 includes an outrigger link 102 pivotally attached to a post 104 extending outward from a side of the second mover 98. A two-axis joint 106 pivotally couples the outrigger link 102 to an end of a pusher link 108 terminated at a pusher 110 at its opposite end. The pusher 110 rides in a slot 112 between two rails 114, 115 forming the holder 94. A rocker link 116 is pivotally connected at one end to the bottom of the tray holder 94 and is both pivotally and slidingly connected to a longitudinal slot 118 in the middle of the pusher link 118. The pusher link 108 and the rocker link 116 form a Scott-Russell linkage. A third mover 120, i.e., another pusher mover, on the opposite side of the central first mover 92 from the second mover 98 has a second linkage 100' similar to the first linkage 100, except that it extends from the opposite lateral side of the third mover 120. The pushers 110 at the ends of each pusher link 108 are offset in the travel direction 25 of the movers 92, 98, 120 to prevent them from colliding in the slot 112.

Figure 8C:
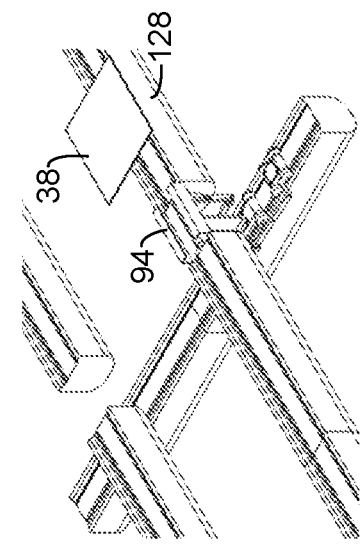
FIGS. 8A-8F are isometric views of a tray conveyor showing the sequence of transferring trays from one conveyor section to three other conveyor sections.

FIGS. 8A-8F and 9A-9G illustrate the operation of a tray router using a tray shuttle 90 as in FIG. 7 to route conveyor trays from one tray conveyor section to another. FIG. 8A shows a tray 38 being propelled along a first conveyor section 124 toward the tray holder 94 of the tray shuttle 90. The tray holder 94 is positioned in line with a first end 126 of the first conveyor section 124 and a second end 127 of a second conveyor section 128. The tray holder 94 bridges a gap 130 between the first and second conveyor sections 124, 128. If the tray 38 is destined to cross the gap 130 onto the second conveyor section 128, the tray shuttle's pushers 110, 110' are both retracted as shown in FIG. 9A allowing the tray 38 to coast across the tray holder 94 and onto the second conveyor section, as shown in FIGS. 8B and 8C.

Figure 8B:
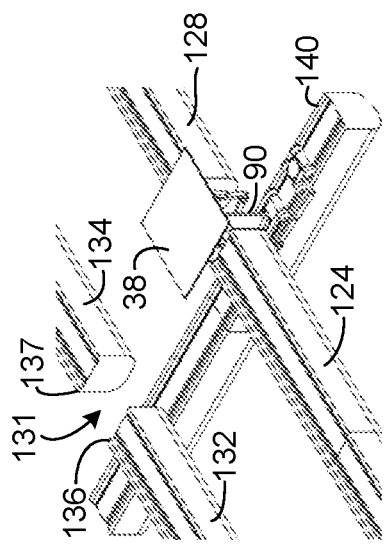
Figure 8A:
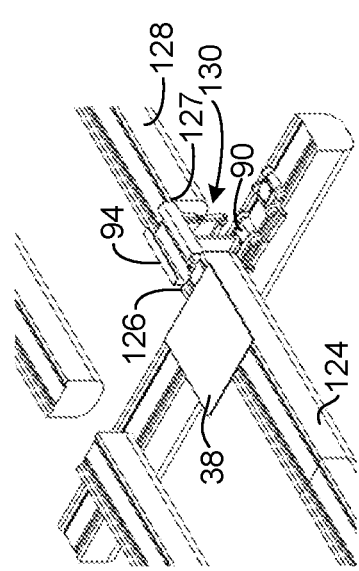
Figure 8F:
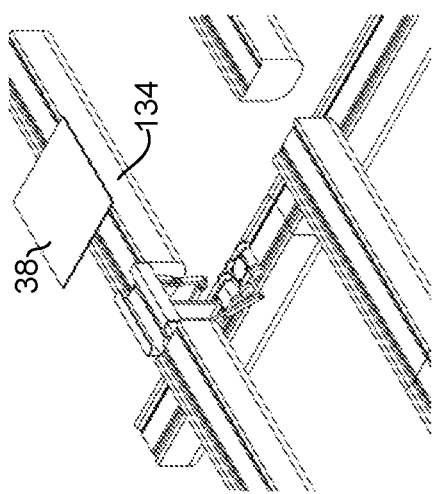
Figure 9A:
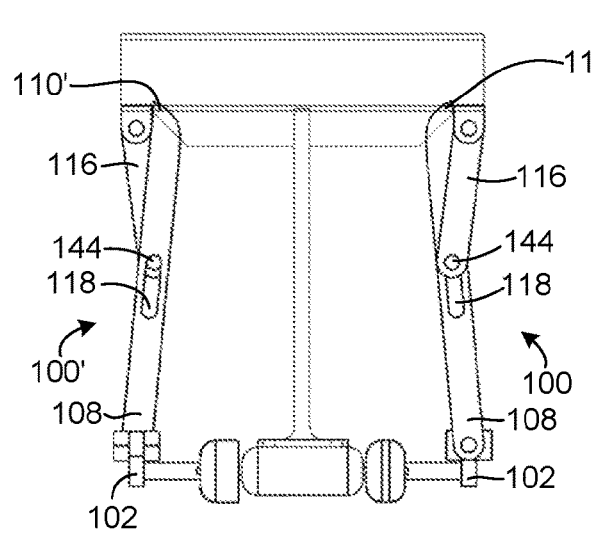
FIGS. 9A-9G are front elevation views of the tray shuttle of FIG. 7 showing tray pushers at various steps in the sequence of FIGS. 8A-8F

The tray conveyor is also shown with third and fourth conveyor sections 132, 134 as in FIG. 8B. All the tray conveyor sections include linear-motor stators to propel the magnetic trays through the interaction of the stators' electromagnetic fields with the magnetic field of the permanent-magnet array in the tray mover. Like the first and second conveyor sections 124, 128, a first end 136 of the third conveyor section 132 is aligned with a second end 137 of the fourth conveyor section 134 across a gap 131. A transfer linear-motor stator 140 extends transverse to the conveyor sections 124, 128, 132, 134 below the gaps 130, 131. The stator 140 propels the tray shuttle 90 along the stator's length to place the tray holder 94 in position bridging the gap 131 to route the tray 38 to its destination conveyor section.

Figure 9B:
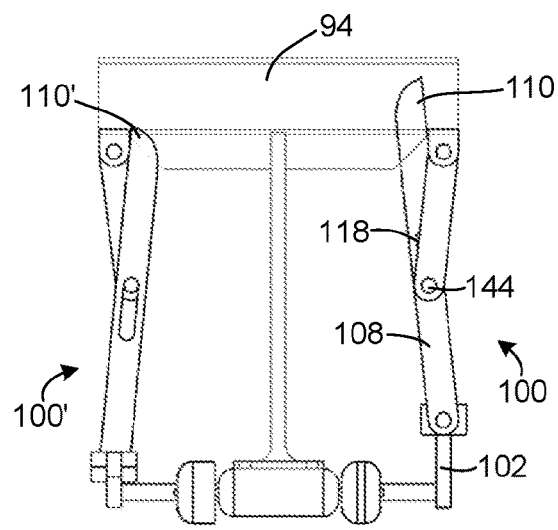

If the tray 38 in FIG. 8B is destined to transfer to the third conveyor section 132 or the fourth conveyor section 134, the pusher 110' closer to the first conveyor section 124 is retracted to allow the tray to enter the holder 94, as shown in FIG. 9B. At the same time, the pusher 110 closer to the second conveyor section 128 is raised in a blocking position to prevent the tray 38 from exiting the holder 94. Before the tray shuttle 90 is moved along the transfer stator 140, the pusher 110' is raised slightly and the pusher 110 is lowered slightly in chocking positions shown in FIG. 9C stabilizing the tray in the holder 94 at opposite ends of the tray's mover. Whenever a tray is being transferred along the transfer stator 140, the pushers 110, 110' are in the chocking position.

Figure 8E:
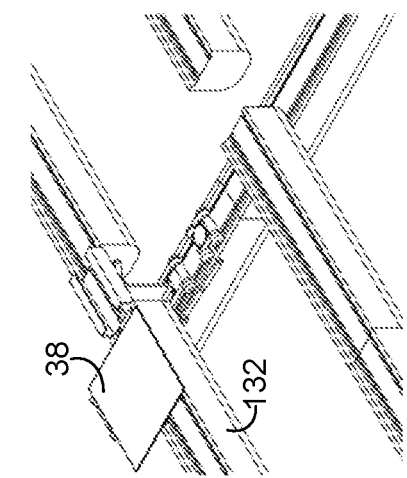
Figure 8D:
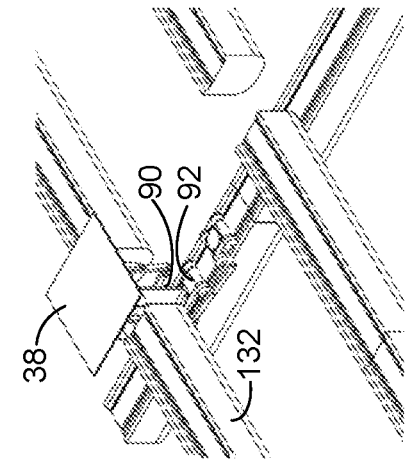
Figure 9C:
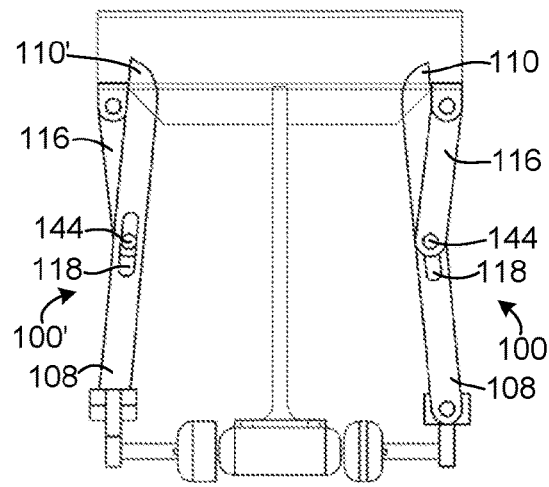
Figure 9D:
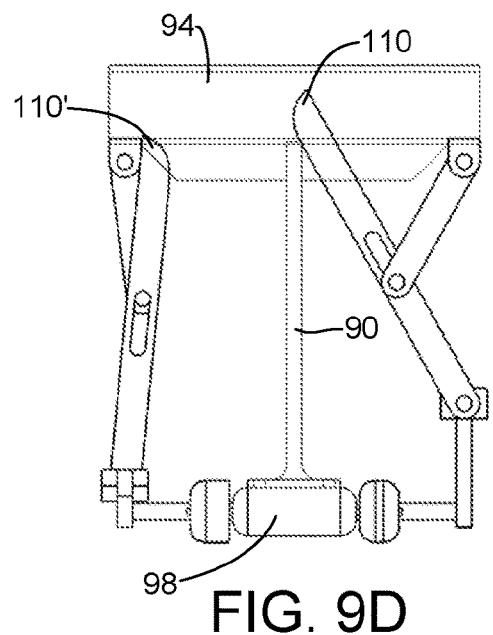
Figure 9E:
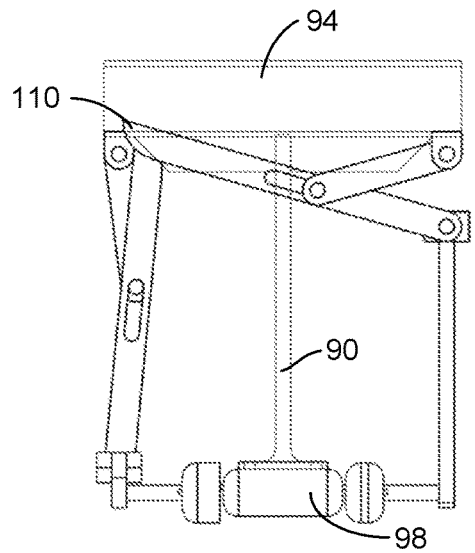
Figure 9F:
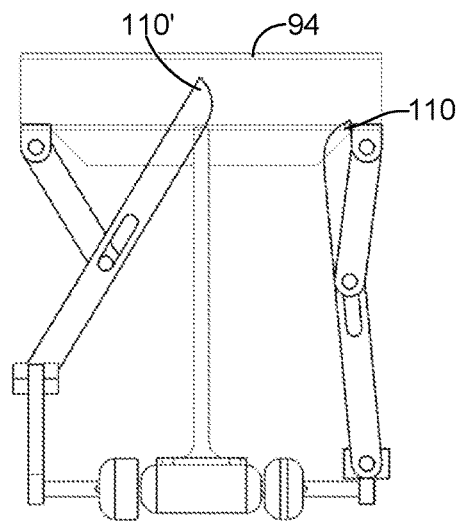
Figure 9G:
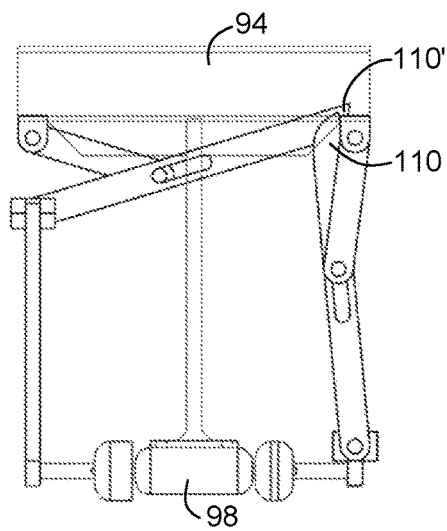

After the tray shuttle 90 has positioned the tray 38 for transfer to the third conveyor section 132 as shown in FIG. 8D, the pusher 110' closer to the third conveyor section is retracted as shown in FIG. 9D. The other pusher 110 is then moved along the tray holder 94 by the movement of the associated pusher mover 98 toward the shuttle's central holder mover 92 as shown in FIGS. 9D and 9E to push the tray 38 onto the third conveyor section 132, as shown in FIG. 8E. FIGS. 9F and 9G show the positions of the pushers 110, 110' pushing the tray 38 in the opposite direction onto the fourth conveyor section 134 as in FIG. 8F.

FIGS. 9A, 9B, and 9C show the operation of the linkages 100, 100'. When the pushers 110, 110' are retracted as in FIG. 9A, the movers are at their maximum distance from the main mover. In that state the end of the outrigger link 102 of each linkage 100, 100' connected to the pusher link 108 is at its lowest position, drawing the pusher link downward. A pin 144 at the lower end of each rocker link 116 sits at the upper end of the slot 118 in the pusher link 108. When the pusher 110, as in FIG. 9B, is extended to push a tray off the holder 94, the rocker link's pin 144 is at the bottom of the slot 118 throughout the pushing sequence as the associated pusher mover moves closer to the central holder mover. During the pushing, the end of the outrigger link 102 connected to the pusher link 108 continues to rise as the distance between the holder mover and the pusher mover decreases to their minimum separation distance. When the pushers 110, 110' are in the chocking position as in FIG. 9C, the pins 144 at the lower ends of the rocker links 116 are positioned in the middle of the slots 118 in the pusher links 108 with the outer pusher movers spaced from the central holder mover by an intermediate distance between the maximum and minimum distances.

Figure 10:
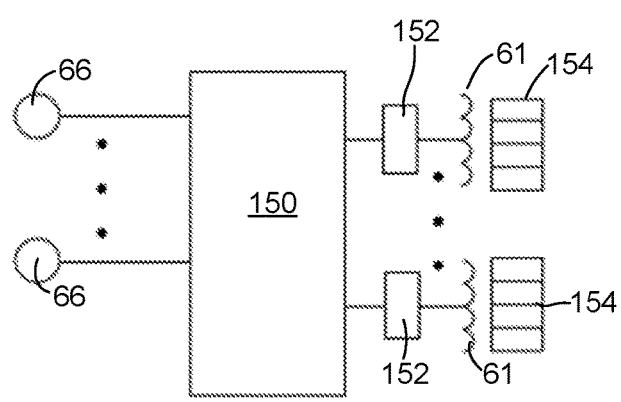
FIG. 10 is a block diagram of a control system for use with any of the tray conveyors.

A control system for controlling the shuttles and the trays on a tray conveyor is shown in FIG. 10. The system is controlled by a main processor 150, such as a microprocessor or other programmable device executing program instructions stored in program memory. The processor 150 receives inputs from the position sensors 66 positioned along the lengths of the conveyor sections. The stator coils 61 are segmented along the length of the conveyor with each segment driven by a dedicated coil driver 152, such as a three-phase coil driver. In that way the processor 150 can independently drive each segment to propel the movers 154 at different speeds. The processor 150 accelerates and decelerates the pusher movers relative to the holder movers to operate the tray pushers in the tray shuttles.

What is claimed is:

1. A tray shuttle comprising:
    a first mover movable bidirectionally in a travel direction;
    a tray holder defining a track supported by the first mover and extending perpendicular to the travel direction;
    a second mover movable bidirectionally in the travel direction of the first mover;
    a pusher movable along the track;
    a linkage connecting the pusher to the first and second movers and moving the pusher along the track by the movement of the second mover relative to the first mover in the travel direction.

2. A tray shuttle as claimed in claim 1 wherein the tray holder includes two parallel rails defining the track.

3. A tray shuttle as claimed in claim 2 wherein the first mover extends in a width direction perpendicular to the travel direction and wherein the two rails are spaced apart in the width direction.

4. A tray shuttle as claimed in claim 2 wherein the first mover extends in a length direction parallel to the travel direction and wherein the two rails are spaced apart in the length direction.

5. A tray shuttle as claimed in claim 2 wherein the pusher moves along the track between the two parallel rails.

6. A tray shuttle as claimed in claim 1 wherein the first and second movers each include a permanent-magnet array.

7. A tray shuttle as claimed in claim 1 wherein the linkage includes a plurality of links including a linkage arm having a pivot end pivotally connected to another one of the links and an opposite free end, wherein the pusher is at the free end of the arm.

8. A tray shuttle as claimed in claim 1 comprising:
    a third mover movable bidirectionally in the travel direction and having a permanent-magnet array, wherein the first mover is between the second and third movers;
    a second pusher movable along the tray holder;
    a second linkage connecting the second pusher to the first and third movers and moving the second pusher to push the conveyor tray along the tray holder by the movement of the third mover relative to the first mover in the travel direction.

9. A tray shuttle as claimed in claim 1 wherein the linkage includes a Scott-Russell linkage.

10. A tray shuttle as claimed in claim 1 wherein the track extends from the first mover.

11. A tray shuttle as claimed in claim 1 comprising a spacer connected between the tray holder and the first mover to space the tray holder from the first mover.

12. A tray conveyor comprising:
    a conveyor tray including a tray mover and a platform supported by the tray mover;
    a tray router including:
        a tray shuttle including:
            a first mover movable bidirectionally in a travel direction and having a permanent- magnet array;
            a tray holder extending from the first mover receiving the tray mover;
            a second mover movable bidirectionally in the travel direction and having a permanent-magnet array;
            a first pusher movable along the tray holder;
            a first linkage connecting the first pusher to the first and second movers and moving the first pusher to push the conveyor tray along the tray holder by the movement of the second mover relative to the first mover in the travel direction;
        a transfer linear-motor stator extending along the travel direction and producing an electromagnetic flux wave that interacts with the magnetic field of the permanent-magnet array in the first mover to propel the tray shuttle in the travel direction.

13. A tray conveyor as claimed in claim 12 wherein the transfer linear-motor stator is segmented into coil segments that are individually driven to produce individual electromagnetic flux waves in each coil segment that interact separately with the magnetic fields of the permanent-magnet arrays in the first and second movers to move the second mover in the travel direction relative to the first mover to cause the first pusher to push the conveyor tray along the tray holder.

14. A tray conveyor as claimed in claim 12 wherein the second mover moves toward the first mover to cause the first pusher to push the conveyor tray along the tray holder away from the first mover and moves away from the first mover to retract the first pusher.

15. A tray conveyor as claimed in claim 12 comprising:
a first conveyor section including a linear-motor stator that extends from a first end perpendicular to and spaced apart from the transfer linear-motor stator across a first gap;
a second conveyor section including a linear-motor stator that extends from a first end perpendicular to and spaced apart from the transfer linear-motor stator across a second gap;
wherein the first and second conveyor sections are spaced apart from each other; and
wherein the tray shuttle moves in the travel direction from a first position in which the tray holder bridges the first gap and a second position in which the tray holder bridges the second gap.

16. A tray conveyor as claimed in claim 12 wherein:
the tray holder includes two parallel rails defining a track perpendicular to the travel direction;
the first mover extends in a width direction perpendicular to the travel direction and to the track;
the two parallel rails are spaced apart in the width direction; and
the transfer linear-motor stator extends vertically in the travel direction to form an elevator for raising and lowering the conveyor tray.

17. A tray conveyor as claimed in claim 12 wherein:
the tray holder includes two parallel rails defining a track perpendicular to the travel direction;
the first mover extends in a length direction parallel to the travel direction;
the two parallel rails are spaced apart in the length direction; and
the transfer linear-motor stator extends horizontally in the travel direction to form a horizontal translator for translating the conveyor tray horizontally along the linear-motor stator.

18. A tray conveyor as claimed in claim 12 wherein the tray holder includes two parallel rails spaced apart and wherein the conveyor tray mover has wheels along opposite sides that ride in the two parallel rails.

19. A tray conveyor as claimed in claim 12 comprising a stator housing enclosing the transfer linear-motor stator and wherein the first and second movers have wheels along opposite sides that ride along the stator housing.

20. A tray conveyor as claimed in claim 12 wherein the tray shuttle comprises:
a third mover movable bidirectionally in the travel direction and having a permanent-magnet array, wherein the first mover is between the second and third movers;
a second pusher movable along the tray holder;
a second linkage connecting the second pusher to the first and third movers and moving the second pusher to push the conveyor tray along the tray holder by the movement of the third mover relative to the first mover in the travel direction.

21. A tray conveyor as claimed in claim 20 wherein the movement of the second mover toward the first mover moves the first pusher along the tray holder in a first direction and wherein the movement of the third mover toward the first mover moves the second pusher along the tray holder in an opposite second direction.

22. A tray conveyor as claimed in claim 20 wherein:
the first linkage includes a first linkage arm having a pivot end pivotally coupled to the second mover, an opposite free end at the first pusher, a longitudinal slot between the pivot and free ends, and a second linkage arm having a pivot end pivotally coupled to the first mover and an opposite slider end arranged to slide along the longitudinal slot in the first linkage arm;
the second linkage includes a first linkage arm having a pivot end pivotally coupled to the third mover, an opposite free end at the second pusher, a longitudinal slot between the pivot and free ends, and a second linkage arm having a pivot end pivotally coupled to the first mover and an opposite slider end arranged to slide along the longitudinal slot in the first linkage arm of the second linkage.

23. A tray conveyor as claimed in claim 22 wherein:
the second and third movers, when both are spaced apart by a first distance from the first mover, cause the first and second linkages to retract the first and second pushers to non-blocking positions out of contact with the tray mover in the tray holder;
the second and third movers, when both are spaced apart by a second distance from the first mover, cause the first and second linkages to extend the first and second pushers at opposite ends of the tray holder to chock a tray mover in the tray holder;
when the third mover is spaced apart from the first mover by the first distance and the second mover moves from a third distance toward the first mover, the first linkage moves the first pusher to push the tray mover along the tray holder in a first direction;
when the second mover is spaced apart from the first mover by the first distance and the third mover moves from a fourth distance toward the first mover, the second linkage moves the second pusher to push the tray mover along the tray holder in a second direction opposite the first direction;
wherein the first distance is greater than the second distance, which is greater than or equal to the third and fourth distances.

24. A tray conveyor as claimed in claim 20 comprising:
a first conveyor section including a linear-motor stator that extends from a first end of the first conveyor section;
a second conveyor section including a linear-motor stator that extends from a second end of the second conveyor section;
wherein the first end of the first conveyor section and the second end of the second conveyor section are aligned across a first gap;
a third conveyor section including a linear-motor stator that extends from a first end of the third conveyor section;
a fourth conveyor section including a linear-motor stator that extends from a second end of the fourth conveyor section;
wherein the first end of the third conveyor section and the second end of the fourth conveyor section are aligned across a second gap;
wherein the transfer linear-motor stator extends transverse to the first, second, third, and fourth conveyor sections below the first and second gaps; and wherein the tray shuttle moves in the travel direction along the transfer linear-motor stator from a first position in which the tray holder bridges the first gap and a second position in which the tray holder bridges the second gap.

25. A tray conveyor as claimed in claim 24 wherein the first pusher and the second pusher push the conveyor tray along the track in opposite directions.

\* \* \* \* \*